(12) United States Patent
Ryu et al.

(10) Patent No.: US 8,866,998 B2
(45) Date of Patent: Oct. 21, 2014

(54) DISPLAY SUBSTRATE AND METHOD OF MANUFACTURING THE SAME

(75) Inventors: Yong-Hwan Ryu, Yongin-si (KR); Shin-Il Choi, Hwaseong-si (KR); Hong-Sick Park, Suwon-si (KR)

(73) Assignee: Samsung Display Co., Ltd. (KR)

( * ) Notice: Subject to any disclaimer, the term of this patent is extended or adjusted under 35 U.S.C. 154(b) by 330 days.

(21) Appl. No.: 13/530,743

(22) Filed: Jun. 22, 2012

(65) Prior Publication Data

US 2013/0146902 A1 Jun. 13, 2013

(30) Foreign Application Priority Data

Dec. 7, 2011 (KR) .......................... 10-2011-0130258

(51) Int. Cl.
*G02F 1/1335* (2006.01)
*G02F 1/1333* (2006.01)

(52) U.S. Cl.
USPC .................. 349/96; 349/92; 349/84; 349/158

(58) Field of Classification Search
CPC ............... G02F 1/133528; G02F 1/133536; G02F 1/133363; G02F 1/133377; G02F 1/133512; G02F 1/133345; G02F 2001/133548; G02F 2001/133528; H01L 21/0273; H01L 27/1214; G02B 5/3033; G02B 5/3016
USPC ........................................ 349/96, 92, 84, 158
See application file for complete search history.

(56) References Cited

U.S. PATENT DOCUMENTS 7,951,527 B2 * 5/2011 Choo et al. .................... 430/321
8,575,031 B2 * 11/2013 Yu et al. ........................ 438/694

FOREIGN PATENT DOCUMENTS

| JP | 2004111780 A | 4/2004 |
| KR | 0512141 B1 | 8/2005 |
| KR | 0609167 B1 | 7/2006 |

* cited by examiner

*Primary Examiner* — Mike Qi
(74) *Attorney, Agent, or Firm* — Cantor Colburn LLP

(57) ABSTRACT

A display substrate includes a metal pattern, a first insulation layer pattern and a second insulation layer pattern. The metal pattern is on a base substrate. The first insulation pattern is on the metal pattern and includes one of a silicon nitride ($SiN_x$) and a silicon oxide ($SiO_x$). The second insulation pattern is on the first insulation pattern and includes a remaining one of the silicon nitride ($SiN_x$) and the silicon oxide ($SiO_x$).

21 Claims, 8 Drawing Sheets

DISPLAY SUBSTRATE AND METHOD OF MANUFACTURING THE SAME

This application claims priority to Korean Patent Application No. 10-2011-0130258, filed on Dec. 7, 2011, and all the benefits accruing therefrom under 35 U.S.C. §119, the contents of which are herein incorporated by reference in their entirety.

BACKGROUND OF THE INVENTION

1. Field of the Invention

Exemplary embodiments of the invention relate to a display substrate and a method of manufacturing the display substrate. More particularly, exemplary embodiments of the invention relate to a display substrate including a polarization pattern and a method of manufacturing the display substrate.

2. Description of the Related Art

Generally, a liquid crystal display ("LCD") device including liquid crystals further includes a polarization layer disposed on a rear surface and an upper surface of an LCD panel, so that the liquid crystals may function as a light shutter.

A polarization film is mainly used as the polarization layer. The polarization layer may include a polarization pattern. However, when a conductive polarization pattern including a striped shape is formed on a base substrate, the base substrate including the polarization pattern formed thereon may have a polarization function which reflects and polarizes an incident light. The striped-shape pattern has a longitudinal axis elongated in a first direction, and a transverse axis perpendicular to the longitudinal axis. When the polarization pattern formed on the base substrate has a nano-scale size, the polarization layer including the nano-scale sized polarization pattern has a polarization ratio near about 1100:1, so that the polarization layer may be replaced with a conventional polarization film. Here, the polarization ratio is defined by a ratio of a vertical polarization to a horizontal polarization.

A polarization layer including the polarization pattern is manufactured by the following process. A metal layer including aluminum (Al) and an insulation layer including a silicon oxide ($SiO_x$) are deposited on a base substrate, and then the insulation layer is etched by using a photoresist, such that the etched insulation layer may function as a hard mask in a subsequent process. The metal layer is etched by using the hard mask to manufacture the polarization layer including the polarization pattern. However, the manufacturing method of the polarization layer described above may generate the following problems.

Generally, when an etching process is performed, an over-etching may be generated where about 30% more of a thin layer is undesirably removed. Thus, an etching mask should have a sufficient thickness as a margin against the over-etching.

However, when a thickness of the photoresist is not sufficient, a mask which is formed by a lower layer is blocked due to an over-etching process, so that the finally formed polarization pattern is not uniform. When a thickness of the photoresist is increased in order to prevent the above problem, a slant of the photoresist pattern may be generated. That is, a defect of the photoresist pattern itself may be generated.

Moreover, in a case that a metal layer has a stacked metal structure including titanium (Ti) and aluminum (Al), a reaction product material such as titanium fluoride ($TiF_x$) polymer, etc., may be generated when an etching process using fluorine gas is performed. The titanium fluoride ($TiF_x$) polymer may be formed by a fluorine gas used for etching an insulation layer which includes a silicon oxide ($SiO_x$), and for etching titanium (Ti) formed under the insulation layer. The titanium fluoride ($TiF_x$) polymer may disturb a subsequent patterning process used to form the polarization pattern.

BRIEF SUMMARY OF THE INVENTION

One or more exemplary embodiments of the invention provide a display substrate having minimal defects from a process of forming a polarization pattern thereon, and an enhanced productivity of forming the display substrate.

One or more exemplary embodiments of the invention also provide a method of manufacturing the above-mentioned display substrate.

According to an exemplary embodiment of the invention, a display substrate includes a metal pattern, a first insulation pattern and a second insulation pattern. The metal pattern is on a base substrate. The first insulation pattern is on the metal pattern and includes one of a silicon nitride ($SiN_x$) and a silicon oxide ($SiO_x$). The second insulation pattern is on the first insulation pattern and includes a remaining one of the silicon nitride ($SiN_x$) and the silicon oxide ($SiO_x$).

In an exemplary embodiment, the display substrate may further include an element layer including a switching element, a data line and a gate line.

In an exemplary embodiment, the first and second insulation patterns may be between the element layer and the metal pattern.

In an exemplary embodiment, the base substrate may be between the element layer and the metal pattern.

In an exemplary embodiment, the metal pattern may be between the first and second insulation patterns, and the element layer.

According to another exemplary embodiment of the invention, there is provided a method of manufacturing a display substrate. In the method, a metal layer is formed on a base substrate. A first insulation layer which includes one of a silicon nitride ($SiN_x$) and a silicon oxide ($SiO_x$), is formed on the metal layer. A second insulation layer which includes a remaining one of the silicon nitride ($SiN_x$) and the silicon oxide ($SiO_x$), is formed on the first insulation layer. A photoresist pattern is formed on the second insulation layer. A first etching uses the photoresist pattern as a first mask to form a second insulation layer pattern. A second etching uses the second insulation layer pattern as a second mask to form a first insulation layer pattern. A third etching uses the first insulation layer pattern as a third mask to form a metal layer pattern.

In an exemplary embodiment, during the first and second etching, an intensity of carbon-nitride light may be detected, and the first and second etching processes may be respectively stopped when the intensity of the carbon-nitride light is greater than a reference range, such that the stopping the first and second etching prevents an over-etching of the first insulation layer and the metal layer, respectively.

In an exemplary embodiment, the metal layer may include a first metal sub-layer formed on the base substrate, and a second metal sub-layer formed on the first metal sub-layer. The second metal sub-layer prevents a deformation of the first metal sub-layer.

In an exemplary embodiment, the first metal sub-layer may include aluminum (Al), and the second metal sub-layer includes titanium (Ti).

In an exemplary embodiment, a thickness of the second metal sub-layer may be substantially smaller than a thickness of the first metal sub-layer.

In an exemplary embodiment, a thickness of the second insulation layer may be substantially larger than a thickness of the first insulation layer.

In an exemplary embodiment, the forming the metal layer may include a sputter deposition process.

In an exemplary embodiment, the forming the first and second insulation layers may include a chemical vapor deposition ("CVD") process.

In an exemplary embodiment, the forming the photoresist pattern may include a photolithography process.

In an exemplary embodiment, the first, second and third etching may include a dry etching process.

In an exemplary embodiment, the first and second etching may use a gas including a fluoride, and the third etching may use a gas including a chloride.

In an exemplary embodiment, the photoresist pattern may be further removed.

In an exemplary embodiment, a planarization layer molding the first and second insulation and the metal pattern, may be further formed thereon.

In an exemplary embodiment, an element layer including a switching element, a data line and a gate line, may be further formed on the base substrate, such that the planarization layer is between the element layer and the base substrate.

In an exemplary embodiment, an element layer including a switching element, a data line and a gate line, may be further formed on a first surface of the base substrate where the planarization layer is formed on a second surface opposite to the first surface of the base substrate.

In an exemplary embodiment, prior to forming the metal layer on the base substrate, an element layer including a switching element, a data line and a gate line, may be formed on the base substrate, such that the element layer is between the metal layer and the base substrate.

According to one or more exemplary embodiments of a display substrate and a method of manufacturing the display substrate, when first and second insulation layers different from each other are used as masks to etch a polarization pattern, an over-etching is reduced or effectively prevented so that a defect of the display substrate generated when there is an inadequate photoresist thickness may be reduced or effectively prevented. Moreover, a reaction product material generated from a coupling of an etching gas and a metal layer is minimized, so that productivity of forming a display substrate may be enhanced.

BRIEF DESCRIPTION OF THE DRAWINGS

The above and other features and advantages of the invention will become more apparent by describing in detailed exemplary embodiments thereof with reference to the accompanying drawings, in which.

DETAILED DESCRIPTION OF THE INVENTION

Figure 1:
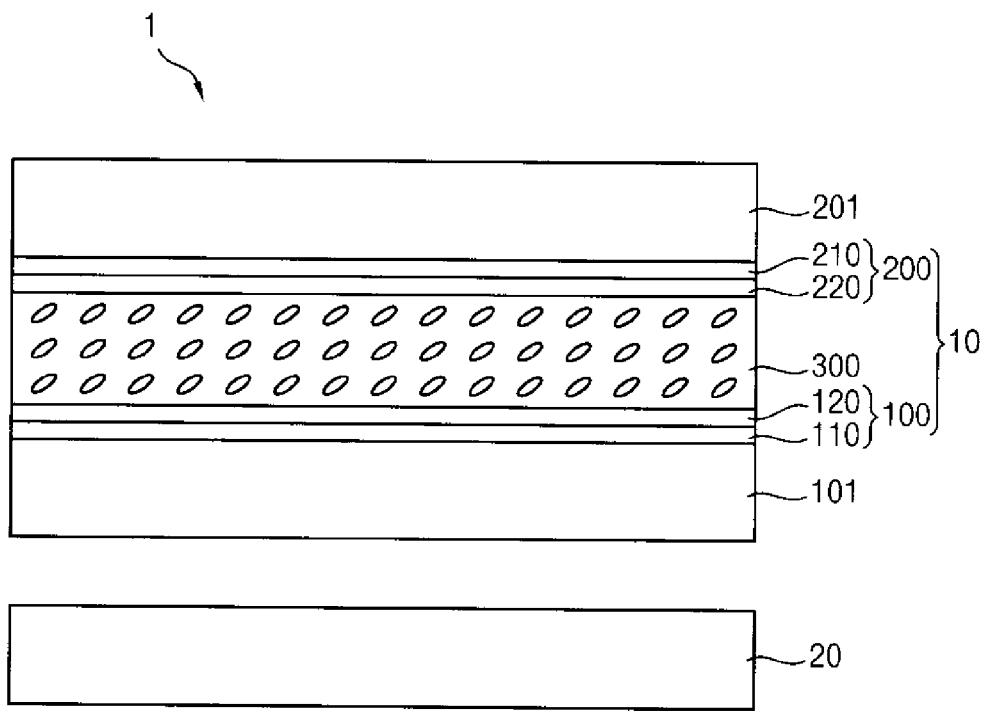
FIG. 1 is a cross-sectional view schematically illustrating an exemplary embodiment of a display device including a display substrate according to the invention.

It will be understood that when an element or layer is referred to as being "on" or "coupled to" another element or layer, the element or layer can be directly on or coupled to another element or layer or intervening elements or layers. In contrast, when an element is referred to as being "directly on" or "directly coupled to" another element or layer, there are no intervening elements or layers present. As used herein, connected may refer to elements being physically and/or electrically connected to each other. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "below," "lower," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "lower" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be explained in detail with reference to the accompanying drawings.

Figure 2:
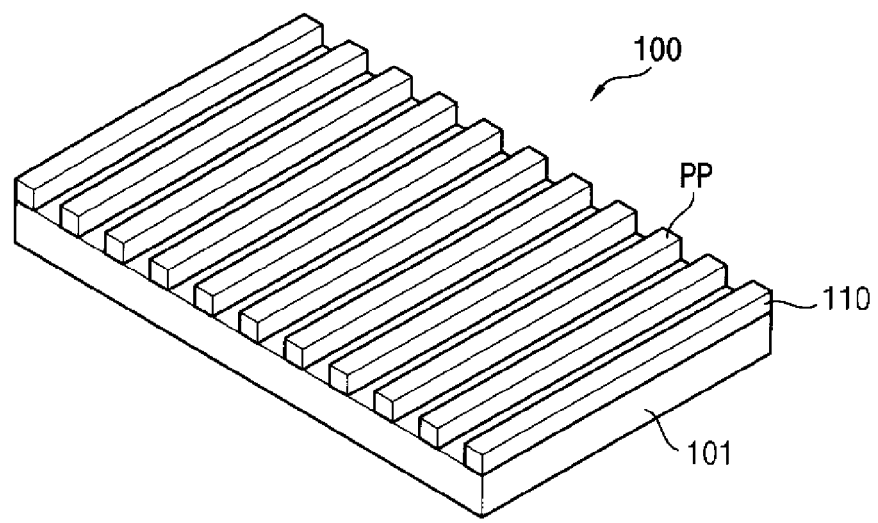
FIG. 2 is a perspective view schematically illustrating an exemplary embodiment of a first display substrate of FIG. 1.

FIG. 1 is a cross-sectional view schematically illustrating an exemplary embodiment of a display device including a display substrate according to the invention. FIG. 2 is a perspective view schematically illustrating an exemplary embodiment of a first display substrate of FIG. 1.

Referring to FIGS. 1 and 2, a display device 1 includes a display panel 10 and a backlight assembly 20.

The display panel 10 includes a first display substrate 100, a second display substrate 200 and a liquid crystal layer 300. The first display substrate 100 and the second display substrate 200 are opposite to each other with respect to the liquid crystal layer 300. The liquid crystal layer 300 is interposed between the first display substrate 100 and the second display substrate 200.

The first display substrate 100 includes a first base substrate 101, a first polarization layer 110 and a first element layer 120. The second display substrate 200 includes a second base substrate 201, a second polarization layer 210 and a second element layer 220.

The first base substrate 101 and the second base substrate 201 may include a transparent insulation material.

The first polarization layer 110 is disposed between the first base substrate 101 and the liquid crystal layer 300. The first polarization layer 110 may polarize light provided from the backlight assembly 20. The first polarization layer 110 may have a first polarization axis. The first polarization layer 110 passes light having the first polarization axis among lights provided from the backlight assembly 20.

The first element layer 120 includes a switching element (not shown), a data line (not shown) and a gate line (not shown). The first element layer 120 may further include an organic layer (not shown) and a pixel electrode (not shown). In one exemplary embodiment, for example, the first element layer 120 may be on the first polarization layer 110. In another exemplary embodiment, the first element layer 120 may be between the first polarization layer 110 and the first base substrate 101.

The second polarization layer 210 is disposed between the liquid crystal layer 300 and the second base substrate 201. The second polarization layer 210 polarizes lights passing through the liquid crystal layer 300. The second polarization layer 210 has a second polarization axis. The second polarization axis of the second polarization layer 210 may be substantially perpendicular to the first polarization axis of the first polarization layer 110. The second polarization layer 210 passes lights of the second polarization axis among lights passing through the liquid crystal layer 300. The first polarization axis may be substantially perpendicular to the second polarization axis, but is not limited thereto.

The second element layer 220 may further include a common electrode (not shown) and a color filter (not shown). The second element layer 220 may be on the second polarization layer 210. Alternatively, the second element layer 220 may be between the second polarization layer 210 and the second base substrate 201.

The first polarization layer 110 may be integrated on the first base substrate 101, and the second polarization layer 210 may be integrated on the second base substrate 201. That is, the polarization pattern PP of the first polarization layer 110 may be directly on the first base substrate 101. In this case, the first and second polarization layers 110 and 210 are on an inner portion of the display panel 10, such as on inner surfaces of both the first and base substrates 101 and 201. Alternatively, the first and second polarization layers 110 and 210 may be on an exterior portion of the display panel 10. In this alternative case, each of the first and second polarization layers 110 and 210 is on opposite outer surfaces of the first and second base substrate 101 and 201, respectively. That is, when the first element layer 120 is on a first surface of the first base substrate 101, the first polarization layer 110 may be on an opposing second surface of the first base substrate 101. When the second element layer 220 is on a first surface of the second base substrate 201, the second polarization layer 210 may be on an opposing second surface of the second base substrate 201.

A distance between adjacent polarization patterns PP may be about 30 nanometers (nm). Each of the polarization patterns PP has a length or longitudinal axis which is extended along a first direction, and the polarization patterns PP are arranged along a second direction crossing the first direction. The distance between the adjacent polarization patterns PP is taken in the second direction. Lights irradiated into an area including the polarization patterns PP are blocked and/or reflected, and a polarization is generated between the polarization patterns PP. The polarization patterns (not shown) of the second polarization layer 210 may have a longitudinal axis which crosses the longitudinal axis of the polarization patterns PP of the first polarization layer 110, to form a predetermined angle between the two longitudinal axes.

The liquid crystal layer 300 is disposed between the first base substrate 101 and the second base substrate 201. The liquid crystal layer 300 includes liquid crystal molecules. When an electric field is generated between a pixel electrode (not shown) of the first display substrate 100 and a common electrode (not shown) of the second display substrate 200, arrangements of the liquid crystal molecules are changed to determine a transmissivity of the liquid crystal layer 300.

The backlight assembly 20 generates lights and provides the display panel 10 with the lights. The backlight assembly 20 may be disposed below and overlapping the first display substrate 100.

The backlight assembly 20 includes a light source (not shown) generating and emitting the lights. In exemplary embodiments, for example, the backlight assembly 20 may include at least one of a cold cathode fluorescent lamp ("CCFL"), an external electrode fluorescent lamp ("EEFL"), a flat fluorescent lamp ("FFL") and a light-emitting diode ("LED"). The backlight assembly 20 may be a direct-illumination type or an edge-illumination type assembly. The backlight assembly 20 may further include a reflection plate (not shown) reflecting lights which are not passed through the first polarization layer 110, toward the first base substrate 101.

Figure 3:
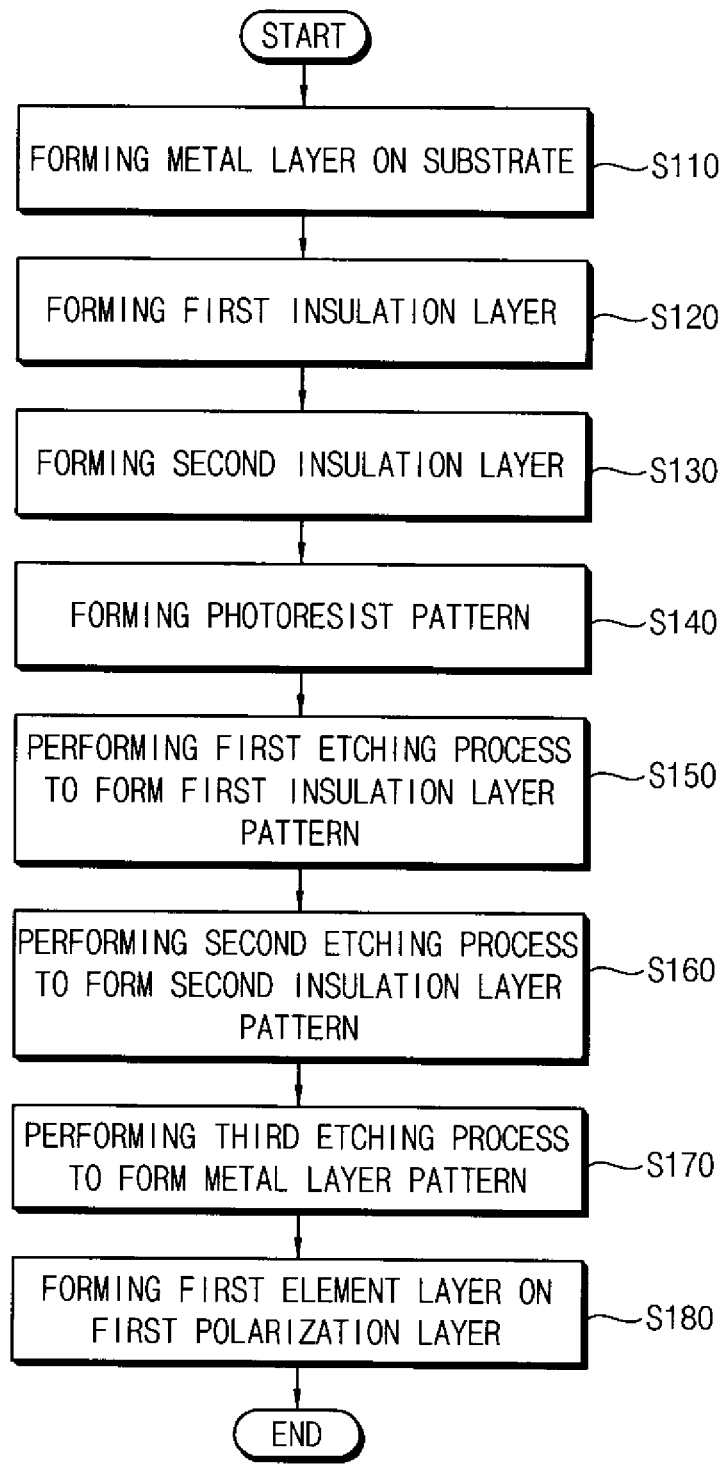
FIG. 3 is a flowchart explaining an exemplary embodiment of a method of manufacturing a first display substrate of FIG. 2.
Figure 5:
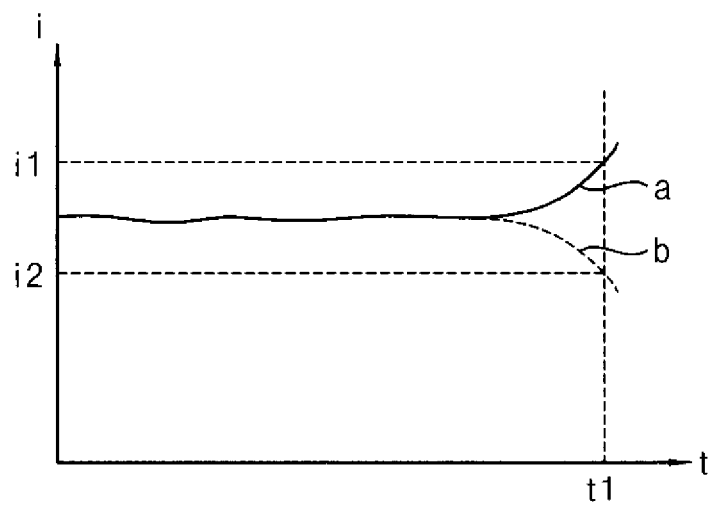
FIG. 5 is a graph showing a variation amount of an intensity of carbon nitride (CN) light in accordance with a processing time.
Figure 6:
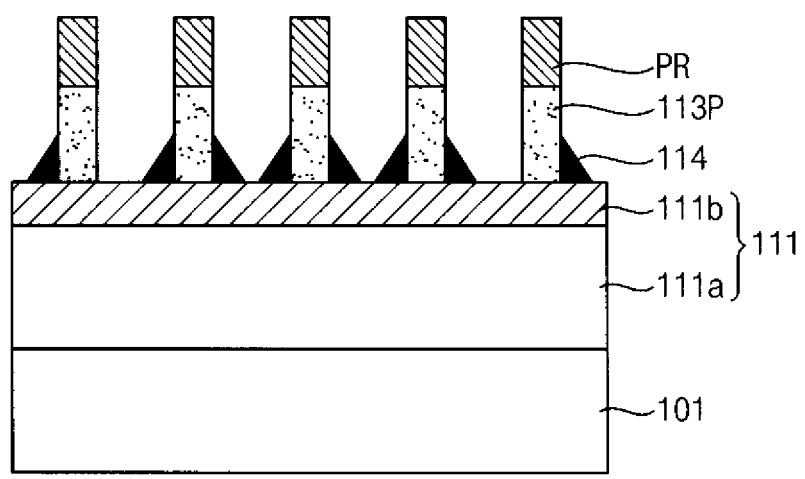
FIG. 6 is a cross-sectional view schematically illustrating an example of a reaction product material generated when an etching process is performed.

FIG. 3 is a flowchart explaining an exemplary embodiment of a method of manufacturing a first display substrate of FIG. 2. FIGS. 4A, 4B, 4C, 4D, 4E, 4F, 4G and 4H are cross-sectional views schematically illustrating the exemplary embodiment of the method of manufacturing a first display substrate of FIG. 3. FIG. 5 is a graph showing a variation amount of an intensity of carbon nitride (CN) light in accordance with a processing time. FIG. 6 is a cross-sectional view schematically illustrating an example of reaction product material generated when an etching process is performed.

A method of manufacturing the first display substrate 100 is substantially the same as the method of manufacturing the second display substrate 200, so that a description for the method of manufacturing the first display substrate 100 will be explained as an example.

Figure 4A:
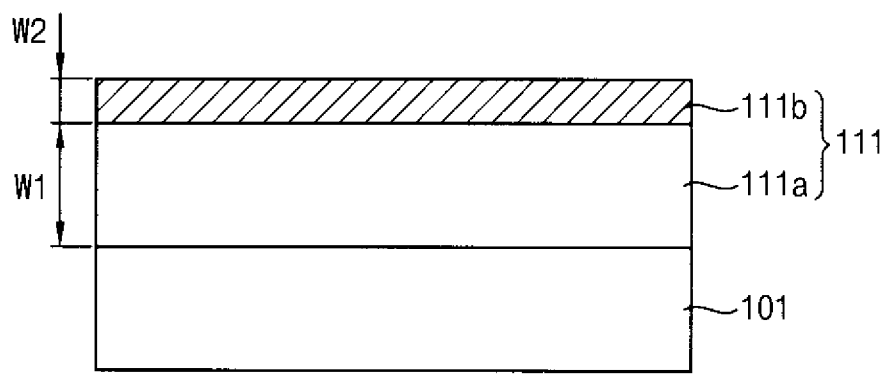
FIGS. 4A, 4B, 4C, 4D, 4E, 4F, 4G and 4H are cross-sectional views schematically illustrating the exemplary embodiment of the method of manufacturing a first display substrate of FIG. 3.

Referring to FIGS. 3 and 4A, a metal layer 111 is formed on the first base substrate 101 (hereinafter, a base substrate) (step S110). The metal layer 111 may include a first metal sub-layer 111a and a second metal sub-layer 111b. The first metal sub-layer 111a is formed directly on the base substrate 101. The first metal sub-layer 111a may include aluminum (Al). The second metal sub-layer 111b is formed directly on the first metal sub-layer 111a. The second metal sub-layer 111b prevents deformation of the first metal sub-layer 111a. The second metal sub-layer 111b may include titanium (Ti).

A thickness W2 of the second metal sub-layer 111b is substantially smaller than a thickness W1 of the first metal sub-layer 111a. In one exemplary embodiment, for example, the thickness W1 of the first metal sub-layer 111a may be about 500 angstroms (Å) to about 3000 Å, and the thickness W2 of the second metal sub-layer 111b may be about 110 Å to about 500 Å. In an alternative exemplary embodiment, the second metal sub-layer 111b may be omitted. In addition, materials of the first and second metal sub-layers 111a and 111b may be varied if it is desired. Furthermore, the thickness of the first and second metal sub-layers 111a and 111b may be varied if it is desired.

The metal layer 111 may be formed through a sputter deposition process. Sputtering may be considered a well known method of providing relatively uniform deposits of material on a base substrate. Conventionally, the sputtering is accomplished by the impingement of gas ions on a target plate in the presence of an electrostatic field which causes particles of the target plate material to be dislodged therefrom.

Figure 4B:
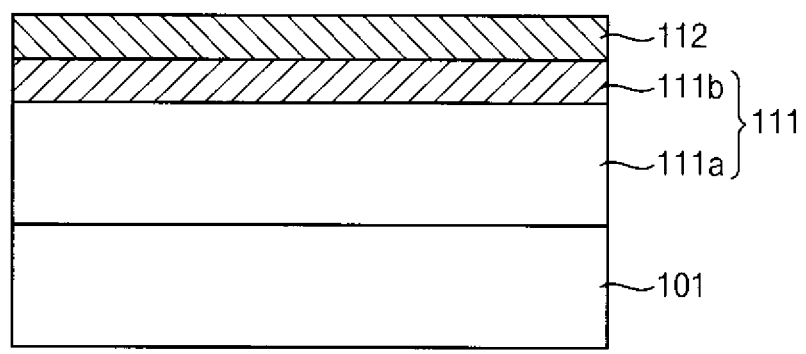

Referring to FIGS. 3 and 4B, a first insulation layer 112 is formed directly on the metal layer 111 (step S112). The first insulation layer 112 includes one of a silicon nitride (e.g., SiNx) and a silicon oxide (e.g., SiOx).

Figure 4C:
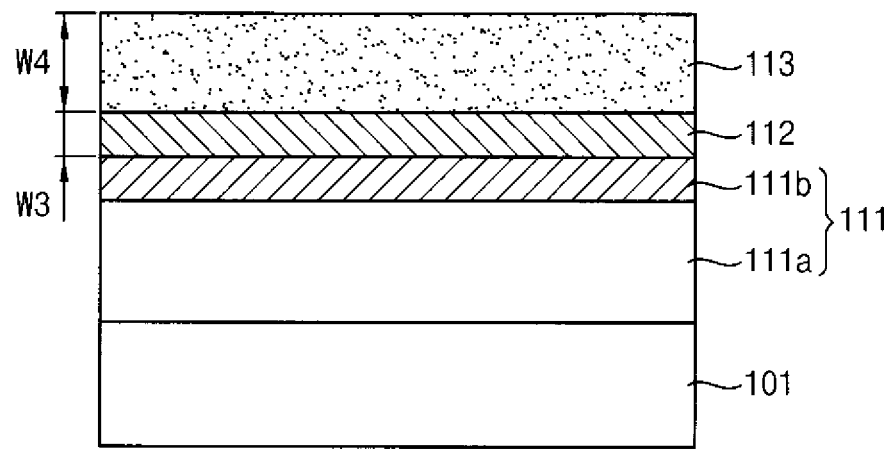

Referring to FIGS. 3 and 4C, a second insulation layer 113 is formed directly on the first insulation 112 (step S113). The second insulation layer 113 includes the other of the silicon nitride (SiNx) and the silicon oxide (SiOx). That is, the second insulation layer 113 is a different material than that of the first insulation layer 112, so that the second insulation layer 113 is a different layer. An embodiment wherein the first insulation pattern includes $SiO_x$ and the second insulation pattern includes $SiN_x$ is specifically mentioned. In $SiO_x$, x may be about 1 to about 2.3, specifically about 1.4 to about 2.2, more specifically about 1.8 to about 2.1. In $SiN_x$, x may be about 0.7 to about 1.7, specifically about 0.8 to about 1.6, more specifically about 0.9 to about 1.5. An embodiment wherein the $SiO_x$ is $SiO_2$ and the $SiN_x$ is $Si_3N_4$ is specifically mentioned.

In one exemplary embodiment, for example, the second insulation layer 113 is the silicon nitride ($SiN_x$) when the first insulation layer 112 is the silicon oxide ($SiO_x$), and the second insulation layer 113 is the silicon oxide ($SiO_x$) when the first insulation layer 112 is the silicon nitride ($SiN_x$). In the exemplary embodiment illustrated in the figures, the first insulation layer 112 is the silicon oxide ($SiO_x$), and the second insulation layer 113 is the silicon nitride ($SiN_x$). Optionally, the silicon nitride ($SiN_x$) may be replaced with the silicon oxide ($SiO_x$).

A thickness W4 of the second insulation layer 113 is substantially larger than a thickness W3 of the first insulation layer 112. In one exemplary embodiment, for example, the thickness W3 of the first insulation layer 112 may be about 110 Å to about 300 Å, and the thickness W4 of the second insulation layer 113 may be about 300 Å to about 1500 Å.

The first and second insulation layers 112 and 113 may be formed through a chemical vapor deposition ("CVD") process. The CVD process may be considered one of the most commonly employed coating processes and involves depositing a surface layer on a base substrate from a reactive gas atmosphere. The gas atmosphere includes several compounds which react with one another at the reaction temperature and form the substance including the surface coating by precipitation thereof onto the base substrate.

In the exemplary embodiment illustrated in figures, the metal layer 111 is formed through a sputter deposition process, and the first and second insulation layers 112 and 113 are formed through a CVD process. However, the invention is not limited in any way to the above discussed exemplary embodiment, and various methods for forming the metal layer 111, and/or the first and second insulation layers 112 and 113 may be possible.

Figure 4D:
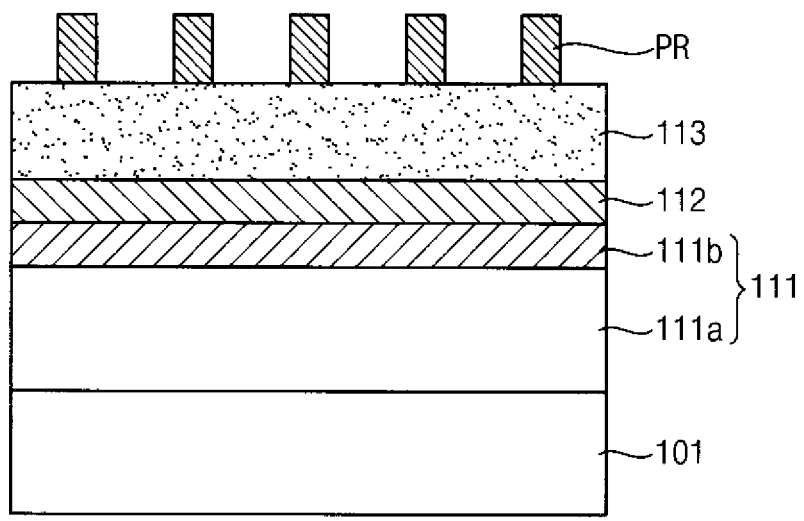

Referring to FIGS. 3 and 4D, a photoresist pattern PR is formed directly on the second insulation layer 113 (step S140). The photoresist pattern PR is a mask pattern for forming the polarization pattern PP on the base substrate 101. The second insulation layer 113 is repeatedly etched through the photoresist pattern PR to form a pattern, so that a side surface of the photoresist pattern PR is perpendicular to the base substrate 101 to realize an anisotropic etching. A width of the photoresist pattern PR taken parallel to the base substrate 101 may be no more than about 30 nm.

A formation of the photoresist pattern PR may be performed through a photolithography process. In one exemplary embodiment, for example, the photolithography process may include a coating process coating a photoresist on the second insulation layer 113 that is a target layer, an exposure process irradiating lights onto a predetermined portion of the coated photoresist, and a develop process removing an exposed photoresist portion or a non-exposed photoresist portion.

Figure 4E:
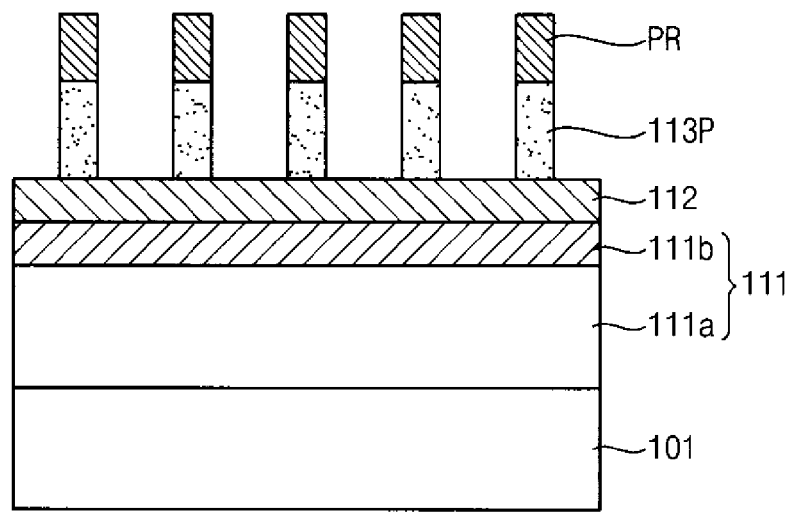

Referring to FIGS. 3 and 4E, a second insulation layer pattern 113P is formed by performing a first etching process through the photoresist pattern PR as a mask (step S150). Due to the first etching process, the second insulation layer 113 is formed to have a shape corresponding to the photoresist pattern PR, resulting in the second insulation layer pattern 113P. The second insulation layer 113 is etched such that the second insulation layer pattern 113P is substantially parallel to and aligned with a side surface of the photoresist pattern PR. A portion of the photoresist pattern PR may be removed during the first etching process.

In this case, an intensity of carbon nitride (CN) light is detected when the first etching process is performed. The first etching process may use a gas including fluoride (F) for easily etching an insulation layer. A carbon included in the fluorine gas responds with and carbon nitride (CN) light included in the first insulation layer 112 or the second insulation layer 113 to emit a carbon-nitride light having a predetermined wavelength. In order to detect the carbon-nitride light, a wavelength analysis instrument may be employed in an etching process chamber.

Then, when an intensity of the carbon-nitride light is out of a reference range, the first etching process is stopped to prevent an over-etching. That is, when a portion of the first insulation layer 112 is exposed during the first etching process for the second insulation layer 113, the first etching process is immediately is stopped to prevent the first insulation layer 112 from being over-etched.

Referring to FIG. 5, the horizontal axis represents a processing time 't', and the vertical axis represents an intensity 'i' of carbon-nitride light. A curve 'a' is plotted in the graph when the first insulation layer 112 is a silicon oxide ($SiO_x$) and the second insulation layer 113 is a silicon nitride ($SiN_x$). That is, according to the curve 'a', a regular straight line shape corresponds to when an upper portion of the silicon oxide ($SiO_x$) is etched. When a lower portion of the silicon oxide ($SiO_x$) is exposed to be reacted with a gas, an intensity of the carbon-nitride light exceeds to a first reference value 'i1'. A time 't1' that the intensity of the carbon-nitride light exceeds to the first reference value 'i1' is a stop time of the first etching process.

A curve 'b' is plotted in the graph when the first insulation layer 112 is a silicon nitride ($SiN_x$) and the second insulation layer 113 is a silicon oxide ($SiO_x$). That is, according to the curve 'b', when an upper portion of the silicon nitride ($SiN_x$) is etched, the upper portion of the silicon nitride ($SiN_x$) is reacted with a gas so that an intensity of the carbon-nitride light is maintained substantially uniform. Then, an intensity of the carbon-nitride light is decreased below a second reference value 'i2' after the silicon nitride ($SiN_x$) is fully removed. A time 't1' that the intensity of the carbon-nitride light is below the second reference value 'i2' is a stop time of the first etching process.

Since the first etching process can be stopped, an over-etching is reduced or effectively prevented, so that a defect of the display substrate generated due to an inadequate thickness of a photoresist may be reduced or effectively prevented.

Figure 4F:
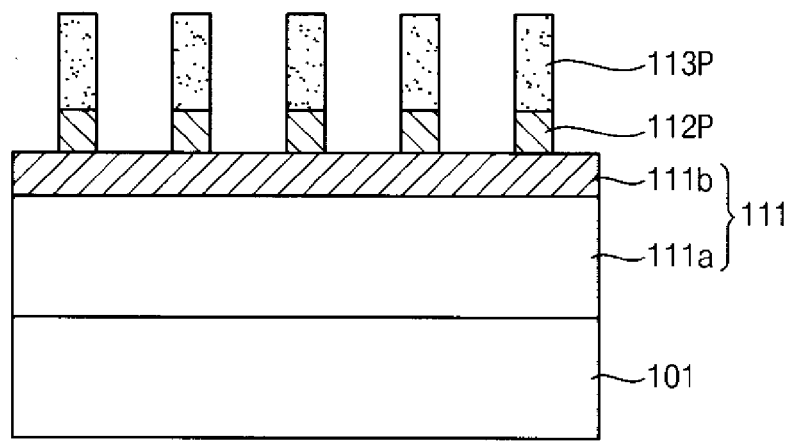

Referring to FIGS. 3 and 4F, a second etching process using the second insulation layer pattern 113P as a mask is performed to form a first insulation layer pattern 112P (step S160). In the second etching process, the second insulation layer pattern 113P may play a role of a hard mask, and the first insulation layer 112 may have a shape corresponding to the second insulation layer pattern 113P. The second etching process may use a gas including a fluoride. The gas including a fluoride may include $SF_6$, $NF_3$, $CF_4$, $CHF_3$, $CH_2F_2$, $C_3F_8$, $C_4F_8$, $C_4F_6$, $C_5F_8$, or a combination thereof. A portion of the photoresist pattern PR and the second insulation layer pattern 113P may be removed through the second etching process.

In this case, when the second insulation layer 113 is a silicon nitride ($SiN_x$) and the second metal sub-layer 111b includes titanium (Ti), an intensity of the carbon-nitride light is detected and then an etching process is stopped based on the detected intensity of the carbon-nitride light. That is, during the second etching process for the first insulation layer 112, when the first insulation layer 112 is fully removed and the metal layer 111 is exposed, the second etching process is immediately stopped to reduce or effectively prevent an over-etching of the second metal sub-layer 111b.

Referring again to FIG. 5, when an upper portion of the silicon nitride ($SiN_x$) is etched, the upper portion of the silicon nitride ($SiN_x$) is reacted with a gas so that an intensity of the carbon-nitride light is maintained to be substantially uniform. Then, an intensity of the carbon-nitride light is decreased below a second reference value 'i2' after the silicon nitride ($SiN_x$) is fully removed. A time 't1' when the intensity of the carbon-nitride light is below the second reference value 'i2' is a stop time of the second etching process.

Referring to FIG. 6, titanium (Ti) of the second metal sub-layer 111b reacts with a fluorine gas that is an etching gas to generate a titanium fluoride (e.g., $TiF_x$). The titanium fluoride ($TiF_x$) is a reaction product material 114 which is continuously generated during the second etching process, and is undesirably deposited between patterns. The titanium fluoride ($TiF_x$) may disturb a subsequent third etching process which etches the metal layer 111. However, when an over-etching is not generated in the second etching process, a reaction product material generated due to a coupling of an etching gas and a metal layer is minimized, so that productivity of forming a display substrate may be enhanced.

Figure 4G:
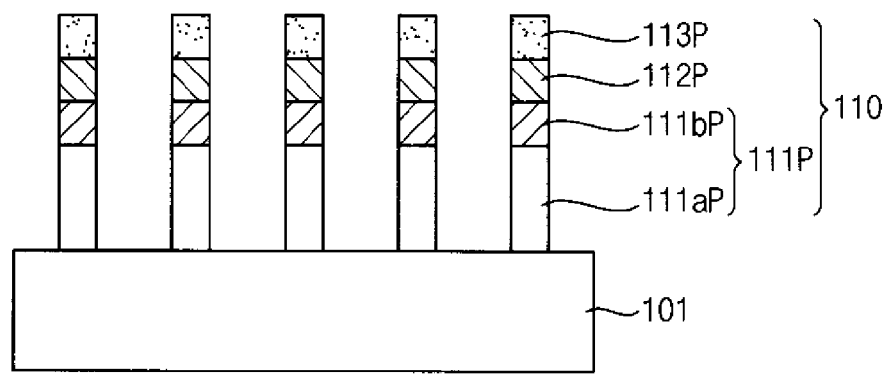

Referring to FIGS. 3 and 4G, a third etching process using the first insulation layer pattern 112P as a mask is performed to form a metal layer pattern 111P (step S170). In the third etching process, the first insulation layer pattern 112P may play a role of a hard mask, and the metal layer 111 may be formed to have a shape corresponding to the first insulation layer pattern 112P. The metal layer pattern 111P formed on the first insulation layer pattern 112P includes a first metal sub-layer pattern 111aP and a second metal sub-layer pattern 111bP. With the forming of the metal layer pattern 111P, the first polarization layer 110 is finally formed on the base substrate 101. The polarization pattern PP includes the first and second insulation layer patterns 112P and 113P and the metal layer pattern 111P. The third etching process may use a gas including a fluoride, a chloride, or a combination thereof. The gas including a fluoride may include $SF_6$, $NF_3$, $CF_4$, $CHF_3$, $CH_2F_2$, $C_3F_8$, $C_4F_8$, $C_4F_6$, $C_5F_8$, or a combination thereof. Representative gases including a chloride include hydrogen chloride. A portion of the second insulation layer pattern 113P may be removed through the third etching process. The first to third etching processes may include a dry etching process.

Figure 4H:
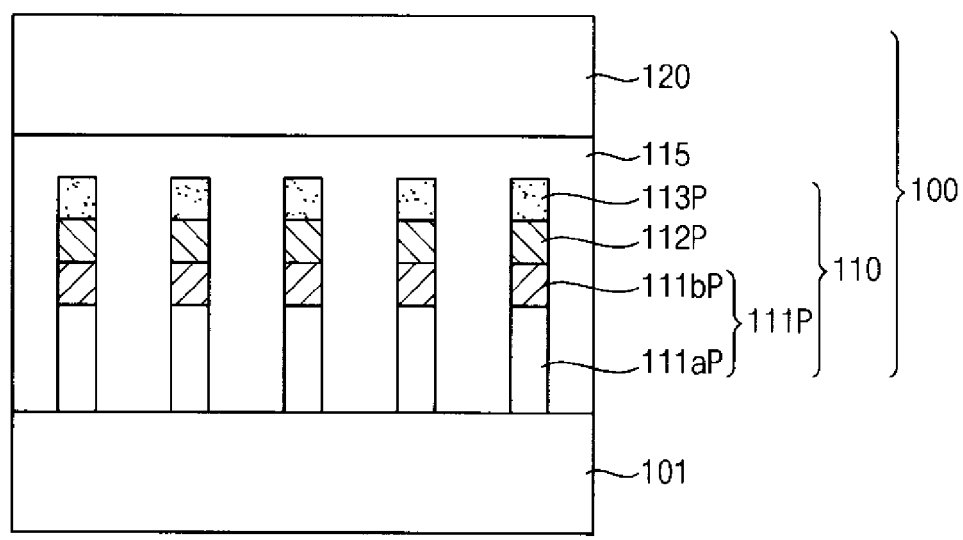

Referring to FIGS. 3 and 4H, the first element layer 120 may be formed on the first polarization layer 110 (step S180). The first element layer 120 includes a switching element, a data line and a gate line. A planarization layer 115 which is around all exposed surfaces of the polarization pattern PP and has a flat top surface may be further formed prior to forming the first element layer 120. The planarization layer 115 may protect the polarization pattern PP and planarize an upper cover surface, so that the first element layer 120 may be easily formed.

In addition, an exemplary embodiment of a method of manufacturing the display substrate may further include a strip process removing a remaining photoresist pattern PR after the third etching process is finished.

Figure 7:
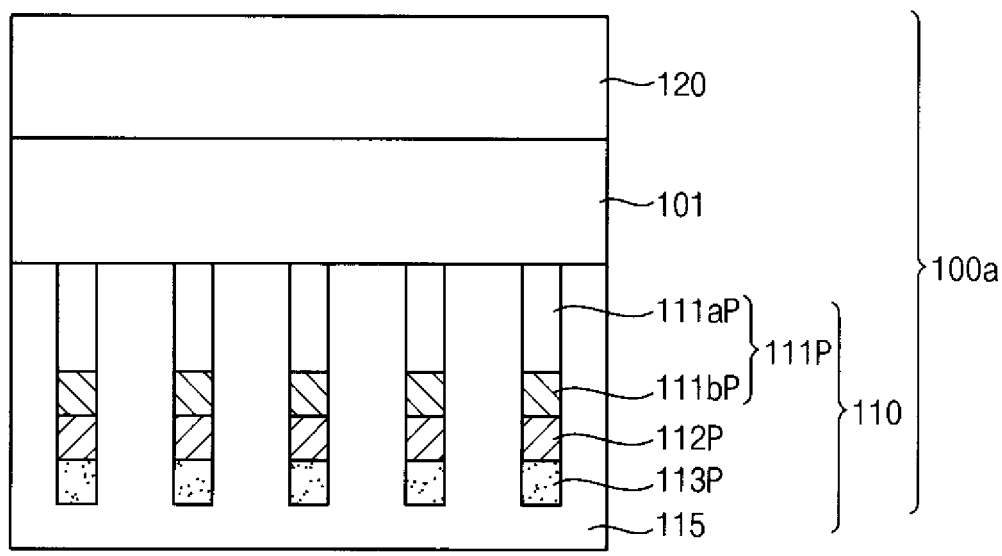
FIG. 7 is a cross-sectional view schematically illustrating another exemplary embodiment of a display substrate according to the invention.

FIG. 7 is a cross-sectional view schematically illustrating another exemplary embodiment of a display substrate according to the invention.

Referring to FIG. 7, in the exemplary embodiment of a display substrate 100a, the first polarization layer 110 may be on a first surface of the first base substrate 101 and the first element layer 120 may be on a second surface opposite to the first surface of the first base substrate 101. Here, in an exemplary embodiment of a method of manufacturing the display substrate 100a, the first polarization layer 110 may be directly formed on the second surface opposite to the first surface of the first base substrate 101 which has the first element layer 120 formed directly thereon, and the first element layer 120 may be directly formed on the second surface opposite to the first surface of the first base substrate 101 which has the first polarization layer 110 formed directly thereon. That is, a processing sequence of the first polarization layer 110 and the first element layer 120 may be varied if is desired.

In one exemplary embodiment, for example, as described in FIGS. 2 to 4G, a process for forming the first element layer 120 on the second surface of the first base substrate 101 may be performed after the first polarization layer 110 is manufactured. Alternatively, a process for forming the first element layer 120 on the second surface of the first base substrate 101 is performed, and then a process for forming the first polarization layer 110 on the first surface opposite to the second surface of the first base substrate may be performed. In this case, a manufacturing method of the first polarization layer 110 is substantially the same as the manufacturing method described in FIGS. 4A to 4G, and thus any repetitive detailed explanation will hereinafter be omitted.

Figure 8:
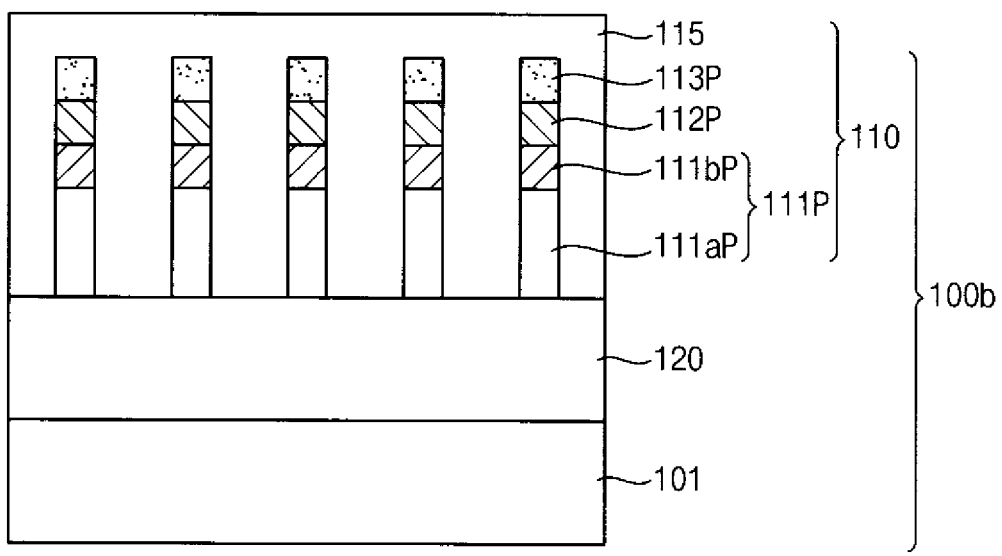
FIG. 8 is a cross-sectional view schematically illustrating still another exemplary embodiment of a display substrate according to the invention.

FIG. 8 is a cross-sectional view schematically illustrating still another exemplary embodiment of a display substrate according to the invention.

Referring to FIG. 8, in the exemplary embodiment of a display substrate 100b, the first element layer 120 may be between the first polarization layer 110 and the first base substrate 101. That is, in an exemplary embodiment of a method of manufacturing the display substrate 100b, the first element layer 120 which includes a switching element, a data line and a gate line may be formed prior to forming the metal layer 111 on the first base substrate 101.

In one exemplary embodiment, for example, a process forming the first element layer 120 on the first base substrate 101 is performed, and then a process forming the metal layer 111 on the first element layer 120 to manufacture the first polarization layer 110 is performed. Then, a manufacturing method of the first polarization layer 110 is substantially the same as the manufacturing method described in FIGS. 4A to 4G except for at least forming the first polarization layer 110 directly on the first element layer 120 instead of the first base substrate 101, and thus any repetitive detailed explanation will hereinafter be omitted.

As described above, according to one or more exemplary embodiments of the invention, a defect of the display substrate which may be generated due to an inadequate thickness of a photoresist when a polarization pattern is formed on a display substrate, may be reduced or effectively prevented, which is. Moreover, a reaction product material generated due to a coupling of (e.g., a reaction between) an etching gas and a metal layer is minimized, so that productivity of forming a display substrate may be enhanced.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A display substrate comprising:
a metal pattern on a base substrate;
a first insulation pattern on the metal pattern and comprising one of a silicon nitride and a silicon oxide; and
a second insulation pattern on the first insulation pattern and comprising a remaining one of the silicon nitride and the silicon oxide.

2. The display substrate of claim 1, further comprising an element layer including a switching element, a data line and a gate line.

3. The display substrate of claim 2, wherein the first and second insulation patterns are between the element layer and the metal pattern.

4. The display substrate of claim 2, wherein the base substrate is between the element layer and the metal pattern.

5. The display substrate of claim 2, wherein the metal pattern is between the first and second insulation patterns, and the element layer.

6. A method of manufacturing a display substrate, the method comprising:
forming a metal layer on a base substrate;
forming a first insulation layer which comprises one of a silicon nitride and a silicon oxide, on the metal layer;
forming a second insulation layer which comprises a remaining one of the silicon nitride and the silicon oxide on the first insulation layer;
forming a photoresist pattern on the second insulation layer;
first etching the second insulation layer using the photoresist pattern as a first mask, to form a second insulation layer pattern;
second etching the first insulation layer using the second insulation layer pattern as a second mask, to form a first insulation layer pattern; and
third etching the metal layer using the first insulation layer pattern as a third mask, to form a metal layer pattern.

7. The method of claim 6, wherein the first and second etching comprises:
detecting an intensity of carbon-nitride light during the forming the first and second insulation layer patterns, respectively; and
stopping the first and second etching, respectively, when the intensity of the carbon-nitride light is greater than a reference range, wherein the stopping the first and second etching prevents an over-etching of the first insulation layer and the metal layer, respectively.

8. The method of claim 7, wherein the metal layer comprises:
a first metal sub-layer formed on the base substrate; and
a second metal sub-layer formed on the first metal layer, wherein the second metal sub-layer prevents deformation of the first metal sub-layer.

9. The method of claim 8, wherein the first metal sub-layer comprises aluminum, and the second metal sub-layer comprises titanium.

10. The method of claim 9, wherein a thickness of the second metal sub-layer is substantially smaller than a thickness of the first metal sub-layer.

11. The method of claim 6, wherein a thickness of the second insulation layer is substantially larger than a thickness of the first insulation layer.

12. The method of claim 6, wherein the forming the metal layer comprises a sputter deposition process.

13. The method of claim 6, wherein the forming the first and second insulation layers comprises a chemical vapor deposition process.

14. The method of claim 6, wherein the forming the photoresist pattern comprises a photolithography process.

15. The method of claim 6, wherein the first etching, the second etching and the third etching each comprises a dry etching process.

16. The method of claim 6, wherein the first and second etching uses a gas comprising a fluoride, and the third etching uses a gas comprising a chloride.

17. The method of claim 6, further comprising:
removing the photoresist pattern.

18. The method of claim 6, further comprising:
forming a planarization layer on an entire of exposed surfaces of the first and second insulation layer patterns and the metal layer pattern.

19. The method of claim 18, further comprising:
forming an element layer including a switching element, a data line and a gate line, on the base substrate, wherein the planarization layer is between the element layer and the base substrate.

20. The method of claim 18, further comprising:
forming an element layer including a switching element, a data line and a gate line, on a first surface of the base substrate, wherein the planarization layer is formed on a second surface opposite to the first surface of the base substrate.

21. The method of claim 6, further comprising:
forming an element layer including a switching element, a data line and a gate line, on the base substrate, prior to the forming the metal layer on the base substrate, wherein the element layer is between the metal layer and the base substrate.

* * * * *